United States Patent
Becker et al.

(10) Patent No.: US 9,046,084 B2
(45) Date of Patent: Jun. 2, 2015

(54) SWASHPLATE-TYPE PIVOT BEARING AND AXIAL PISTON MACHINE

(75) Inventors: Klaus Becker, Herzogenaurach (DE); Thomas Winkler, Sulzbach/Neuweiler (DE); Harald Vornehm, Ammerndorf (DE); Peter Decker, Schwebheim (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 718 days.

(21) Appl. No.: 12/720,841

(22) Filed: Mar. 10, 2010

(65) Prior Publication Data

US 2010/0278463 A1 Nov. 4, 2010

(30) Foreign Application Priority Data

Mar. 13, 2009 (DE) .................. 10 2009 013 094

(51) Int. Cl.
- *F16C 19/50* (2006.01)
- *F04B 1/20* (2006.01)
- *F04B 1/29* (2006.01)
- *F16C 33/30* (2006.01)

(52) U.S. Cl.
CPC .............. *F04B 1/2085* (2013.01); *F04B 1/295* (2013.01); *F16C 19/502* (2013.01); *F16C 33/306* (2013.01)

(58) Field of Classification Search
CPC .... F16C 33/306; F16C 19/502; F04B 1/2078; F04B 1/2085; F04B 1/2028; F04B 1/28; F04B 1/29; F04B 1/295; F03C 1/0671; F03C 1/0668
USPC ........... 384/2, 49, 51, 209, 207, 548, 558, 57; 417/269; 92/12.2, 71; 91/505; 464/167
See application file for complete search history.

(56) References Cited

U.S. PATENT DOCUMENTS

| | | | |
|---|---|---|---|
| 1,471,254 A | 10/1923 | Forbes | |
| 2,605,622 A * | 8/1952 | Anderson | 464/167 |
| 2,977,164 A | 3/1961 | Witte | |
| 3,024,073 A * | 3/1962 | Krueger | 384/49 |
| 4,449,445 A * | 5/1984 | Viles | 92/12.2 |
| 4,558,962 A | 12/1985 | Meinlschmidt | |
| 4,627,330 A * | 12/1986 | Beck, Jr. | 92/12.2 |
| 4,858,480 A * | 8/1989 | Rohde et al. | 74/60 |
| 4,907,898 A | 3/1990 | Dickinson | |
| 5,011,305 A * | 4/1991 | Breuer et al. | 384/572 |
| 5,024,143 A * | 6/1991 | Schniederjan | 92/12.2 |
| 5,069,560 A | 12/1991 | Niedermeier et al. | |
| 5,390,584 A * | 2/1995 | Fritz et al. | 92/12.2 |
| 5,501,533 A * | 3/1996 | Williams et al. | 384/572 |
| 5,528,977 A | 6/1996 | Goade | |
| 5,630,352 A | 5/1997 | Todd | |
| 5,810,482 A | 9/1998 | Aleynik | |

(Continued)

*Primary Examiner* — Alan B Waits
*Assistant Examiner* — Brian McGovern
(74) *Attorney, Agent, or Firm* — Simpson & Simpson, PLLC

(57) ABSTRACT

A swashplate-type pivot bearing, or an axial piston machine that has the swashplate-type pivot bearing, which ensure reliable operation. The swashplate-type pivot bearing for a hydraulic axial piston machine has a housing section, a swashplate section and a multiplicity of rolling bodies. The swashplate section is pivotably mounted in the housing section by the rolling bodies and the rolling bodies are arranged in a full-roller configuration and/or without a cage in at least one rolling body row. The swashplate-type pivot bearing also has at least one follow-up device for follow-up adjustment and/or synchronization of the rolling bodies, which is arranged and/or formed at an end of the rolling body row. The follow-up device is controlled by a slotted guide.

12 Claims, 2 Drawing Sheets

(56) References Cited

U.S. PATENT DOCUMENTS

| | | | |
|---|---|---|---|
| 6,027,250 A * | 2/2000 | Reubelt et al. | 384/2 |
| 6,676,294 B2 | 1/2004 | Harimoto et al. | |
| 6,719,460 B1 | 4/2004 | Becker et al. | |
| 7,178,986 B2 | 2/2007 | Ohtsuki et al. | |
| 7,232,372 B2 * | 6/2007 | Nagatani et al. | 464/111 |
| 7,597,481 B2 | 10/2009 | Scherpf | |
| 7,670,058 B2 | 3/2010 | Schorr et al. | |
| 7,793,582 B2 * | 9/2010 | Becker et al. | 92/12.2 |
| 8,021,235 B2 * | 9/2011 | Tinnin et al. | 464/167 |
| 8,167,503 B2 | 5/2012 | Ueno | |
| 8,172,464 B2 | 5/2012 | Matsushita | |
| 8,376,615 B2 | 2/2013 | Becker et al. | |
| 2006/0110082 A1 | 5/2006 | Tvaruzek | |
| 2006/0291765 A1 * | 12/2006 | Hayward et al. | 384/572 |
| 2009/0126561 A1 | 5/2009 | Becker et al. | |
| 2009/0208161 A1 | 8/2009 | Jauernig et al. | |
| 2010/0278463 A1 | 11/2010 | Becker et al. | |
| 2011/0007994 A1 | 1/2011 | Vornehm et al. | |

* cited by examiner

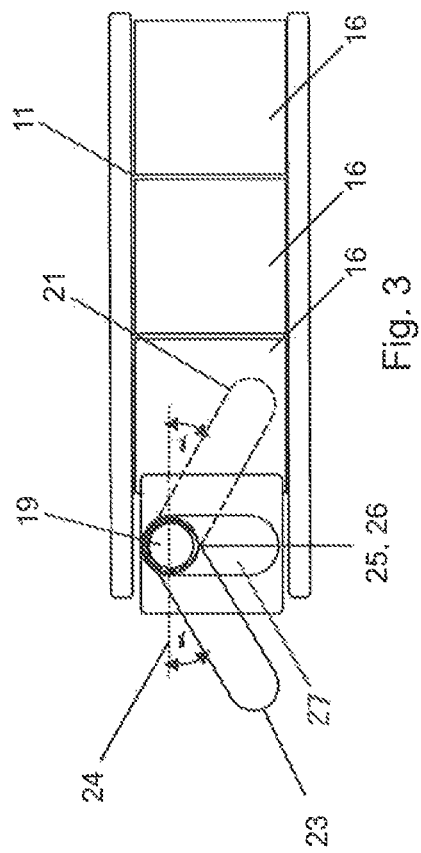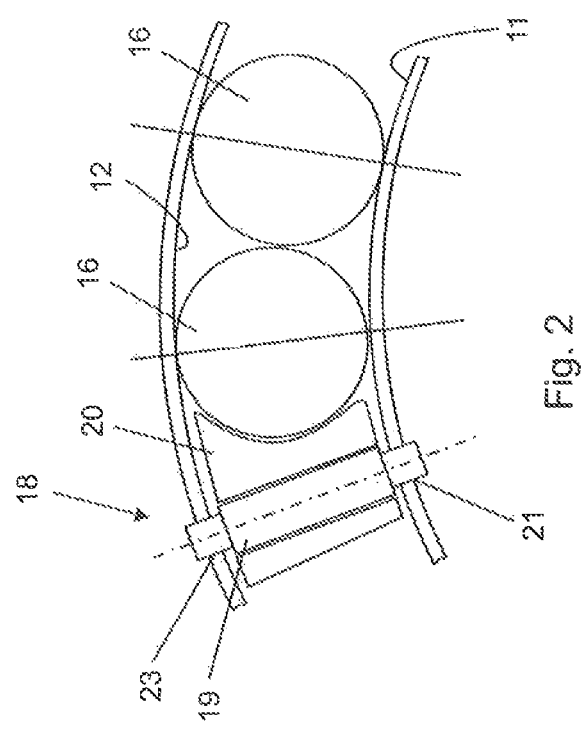

SWASHPLATE-TYPE PIVOT BEARING AND AXIAL PISTON MACHINE

This application claims the priority of DE 10 2009 013 094.2 filed Mar. 13, 2009, which is incorporated by reference herein.

FIELD OF THE INVENTION

The invention relates to a swashplate-type pivot bearing having a housing section, having a swashplate section and having a multiplicity of rolling bodies, with the swashplate section being pivotably mounted in the housing section by means of the rolling bodies, with the rolling bodies being arranged in a full-roller configuration and/or without a cage in at least one row, and having at least one follow-up device which, for providing a follow-up adjustment and/or synchronization of the rolling bodies, is arranged and/or formed at an end of the rolling body row. The invention also relates to an axial piston machine having the swashplate-type pivot bearing.

Swashplate-type pivot bearings are used for example in hydraulic axial piston machines, with a partially cylindrical plate section being pivotably mounted in a partially hollow cylindrical housing region. The pivotable mounting takes place by means of rolling bodies which, as a whole, form a rolling body segment. In some embodiments, bearing shoes are arranged on the plate section, which bearing shoes, during the pivoting movement of the plate section, move pistons of the axial piston machine. The rolling bodies extend only over a circular segment and are moved back and forth during the pivoting movement.

Since displacements can also occur, in addition to the rolling movement of the rolling bodies, on account of vibrations or other disturbances during the pivoting movement, it is necessary to use means which synchronize the positioning of the rolling bodies such that the latter are always arranged in a favorable position for the pivoting movement.

DESCRIPTION OF RELATED ART

Document DE 10 2005 023 275 A1 relates, for example, to a swashplate-type pivot bearing of said type, in which, according to a first embodiment, the rolling bodies are held and guided in a cage. The control of the cage, and therefore the synchronization of the rolling bodies, takes place by means of the interaction of toothings on the plate section and on the housing and toothings which are arranged in an encircling fashion on the rolling bodies. The toothed rolling bodies are situated at the two opposite ends of the row of rolling bodies. In a further embodiment, a swashplate-type pivot bearing is proposed which is of full-roller configuration or has no cage, with the toothings in the plate or housing section extending over the entire length of the row of rolling bodies and with each rolling body having an encircling toothing, such that each rolling body is synchronized independently of its neighbors.

Document US2006291765A1 likewise relates to a full-roller swashplate-type pivot bearing, wherein in contrast to the device in the document cited above, only the in each case two outer rolling bodies have the encircling toothing. Said document arguably forms the closest prior art.

SUMMARY OF THE INVENTION

The object on which the invention is based is that of proposing a swashplate-type pivot bearing, and an axial piston machine having the swashplate-type pivot bearing, which ensure reliable operation.

The swashplate-type pivot bearing according to the invention is preferably suitable and/or designed for an axial hydraulic pump, in particular in an adjusting mechanism for changing the feed volume of the pump. Specifically, the change in feed volume takes place by means of an adjustment of an angle of inclination of the swashplate.

The swashplate-type pivot bearing has a housing section, a swashplate section and a multiplicity of rolling bodies which are arranged such that the swashplate section is pivotably mounted in the housing section. The housing section and swashplate section may serve to provide raceways for the rolling bodies in an integrated fashion; in modified embodiments, the raceways are arranged in bearing shells which are placed onto and/or inserted into the housing section and the swashplate section.

The rolling bodies are preferably designed as rollers, in particular as cylindrical rollers. The swashplate-type pivot bearing preferably comprises precisely one row of rolling bodies which are arranged and/or formed in cross section as a partial segment of a full circle. The housing section has a hollow cylindrical raceway which is arranged opposite a cylindrical raceway of the swashplate section. Both raceways are preferably curved with a common central point, with the central point simultaneously defining the pivot axis.

The rolling bodies are arranged in a full-roller configuration with respect to one another, in particular in direct contact without intermediate and/or guide elements, and/or are positioned without a cage. Even though such full-roller bearings are less suitable for use at high rotational speeds, they have a higher load capacity, which is advantageous in the present embodiment.

For providing a follow-up adjustment and/or synchronization of the rolling bodies, a follow-up device is arranged at least one end of the rolling body row, which follow-up device ensures that the rolling bodies always remain in a favourable position for the pivoting movement. During a pivoting movement, the follow-up device is displaced relative to the housing section and simultaneously relative to the swashplate section and/or is guided concurrently with the rolling bodies. A follow-up device of said type is preferably arranged at each end of the rolling body row.

It is proposed according to the invention that the control, in particular of the relative movement with respect to the housing section and/or with respect to the swashplate section, is realized by means of a slotted guide, with the slotted guide preferably providing positive guidance for the follow-up device.

Here, it is a consideration of the invention to replace a cumbersome toothing of bearing shells and/or cylindrical rollers with a simple slotted guide which is cost-effective to produce. Furthermore, functionally reliable operation is realized by means of the slotted guide.

In one preferred realization of the invention, the follow-up device comprises an end stop for the rolling body at the end of the rolling body row. The end stop is moved by the slotted guide concomitantly with the rolling bodies during a pivoting movement of the swashplate-type pivot bearing. The synchronization and/or follow-up adjustment of the rolling bodies therefore takes place in a sliding fashion by means of the rolling bodies being acted on with force in the rolling direction thereof.

In one preferred structural embodiment of the invention, the slotted guide has a first and a second guide slot, the guide slots being fixedly connected to the housing section and swashplate section, respectively.

In an alternative embodiment of the invention, the guide slots of the slotted guide are moved concomitantly with the follow-up device. Said alternative constitutes a kinematic reversal of the alternative specified above.

In one possible structural realization, it is provided that the first and second guide slots intersect at least in one plane of projection, with the intersection point forming a guide point for the follow-up device. During the pivoting movement and therefore the relative movement between the housing section and swashplate section, the intersection point or the guide point travels along the first and second guide slots, such that the follow-up device is positively guided by the two guide slots together. Since the guide slots intersect at the guide point, positive guidance is obtained without a degree of freedom.

In one preferred embodiment, the follow-up device has a guide member which engages into both guide slots. The guide member therefore forms the sliding block(s) for the slotted guide. Here, it may for example be provided that the guide member engages at one side into both guide slots, at two sides in each case into both guide slots, or at two sides in each case into one guide slot.

In one preferred embodiment, the guide member is designed as a bolt whose free ends engage as sliding block into the first and second guide slots.

In one possible structural realization, the guide slots are arranged on or in one or more planes which is or are perpendicular to the rotational axes of the rolling bodies and/or in the same direction as the longitudinal extent of the rolling body row.

However, it is more preferable if the guide slots extend on one or more surfaces, which are arranged parallel to and/or which are formed by the raceways of the rolling bodies. If said surfaces or used, it is possible to realize a synchronization of the swashplate-type pivot bearing without increasing the installation space in terms of bearing height and/or in the width direction. This advantage is particularly pronounced in the case of arrangements in which installation space is limited.

In one preferred structural realization, the guide slots are arranged or formed on or in the raceways for the rolling bodies and/or an extension of the raceways for the rolling bodies. The extensions may be designed as extensions of constant curvature, but may alternatively be designed as any desired type of extensions, for example planar sections or sections curved in some other way.

In production terms, it is preferable if the guide slots are formed as slots in the raceways. Such slots may be formed in a simple and cost-effective manner.

To obtain positive guidance of the follow-up device, it is preferable if the first guide slot is arranged, in particular inserted, on or in the raceway or its extension of the housing section, with the longitudinal extent of the first guide slot being inclined with respect to the longitudinal extent of the raceway of the housing section by a first angle, preferably in the plane or curved plane of the raceway. By a first definition, the first angle is determined in cylindrical coordinates on the cylindrical running surface, while by a second possible definition, the first angle is measured in a projection in a plan view of the running surface.

It is also preferable for the second guide slot, which is arranged, in particular inserted, in the raceway or its extension of the swashplate section, to be inclined with respect to the longitudinal extent of the raceway of the swashplate section by a second angle. It is also possible for the second angle to be defined both in cylindrical coordinates and also in a projection view.

It is particularly preferable for the first and second angles to be equal in magnitude and/or to differ by less than 15°, preferably less than 10° and in particular less than 5°. The deviation of the angle permits fine adjustment of the positive guidance, as a result of which influences of the different radii of the raceways can be compensated. In particular, in all positions of the swashplate-type pivot bearing, the angles are arranged, in a projection, symmetrically with respect to a line perpendicular to the longitudinal extent of the raceway, which lies in the raceway surface.

A final subject matter of the invention relates to an axial piston machine with variable throughput volume, which axial piston machine is characterized by the swashplate-type pivot bearing as described above, or according to one of the preceding claims. The swashplate-type pivot bearing is preferably designed as a pivoting-base bearing.

BRIEF DESCRIPTION OF THE DRAWINGS

Further advantages, features and effects of the invention can be gathered from the following description of a preferred exemplary embodiment of the invention and from the appended figures, in which:

FIG. 2 shows a detail of the swashplate-type pivot bearing in FIG. 1 in a similar illustration; and FIG. 3 shows the detail of FIG. 2 in a schematic plan view.

DETAILED DESCRIPTION OF THE PREFERRED EMBODIMENTS

Figure 1:
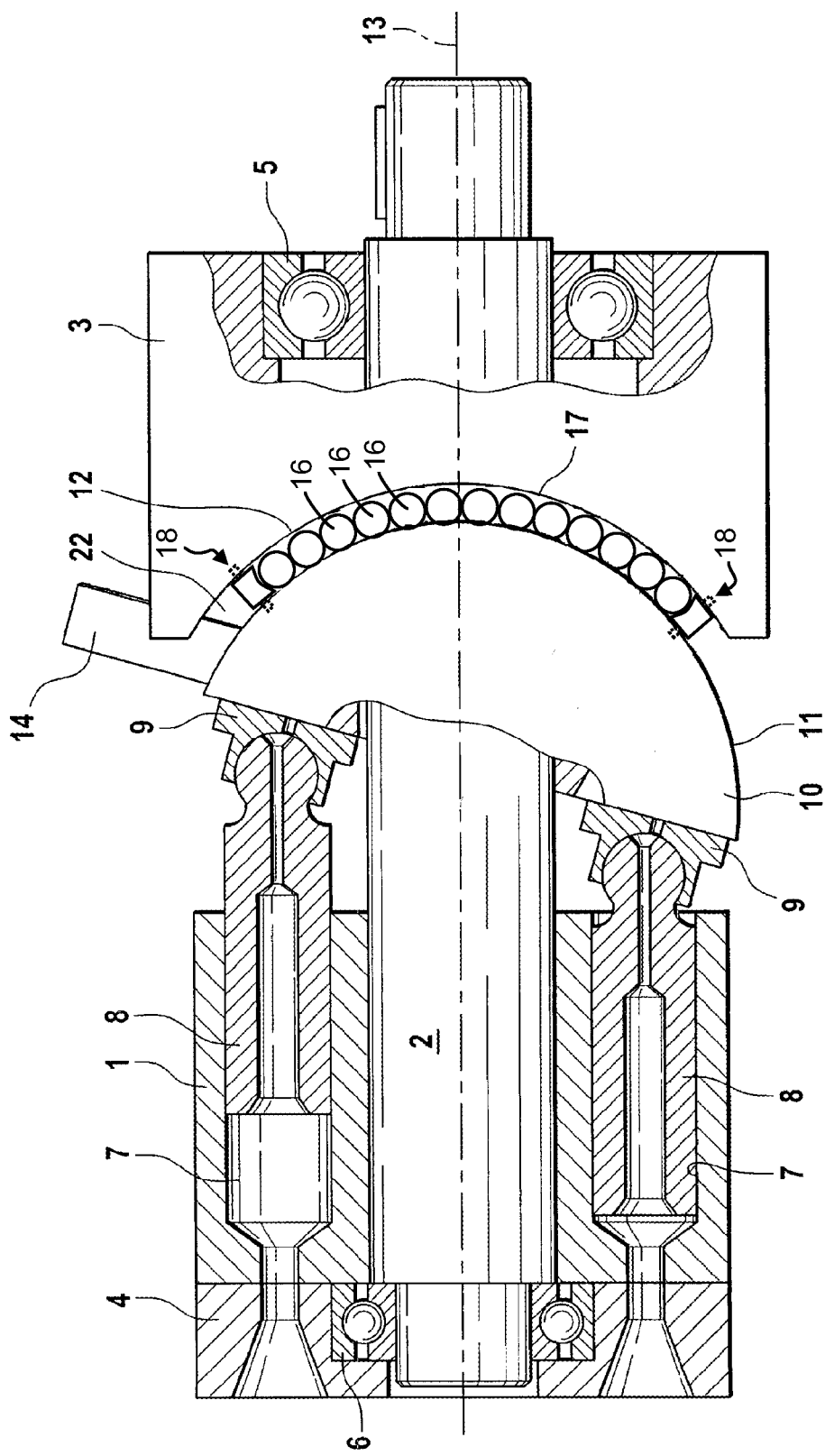
FIG. 1 shows a schematic, partially sectional illustration of an axial hydraulic pump with a swashplate-type pivot bearing as a first exemplary embodiment of the invention.

FIG. 1 shows an axial piston machine having a cylinder drum 1 which is arranged on a shaft 2, with the shaft 2 being a pump or motor drive input shaft or drive output shaft depending on the use of the machine. The shaft 2 is mounted by means of bearings 5 and 6 in a housing composed of the housing section 3 and housing part 4. Within the cylinder drum 1, pistons 8 are arranged within cylinder bores 7, which pistons 8 are supported via sliding shoes 9 on a swashplate 10. The swashplate 10 has a cylindrical bearing surface 11 which is situated opposite a hollow cylindrical bearing surface 12 in the housing section 3. Said two surfaces are spaced apart from one another by a bearing gap 22. The stroke of the pistons 8 in the cylinder bores 7 is set in a known way by varying the angular position of the swashplate 10 with respect to the axis 13 of the shaft 2. For this purpose, an adjusting device (not illustrated) engages, for example, on a lever 14 which is fixedly connected to the swashplate 10. Arranged in the bearing gap 22 between the bearing surfaces 11 and 12 is a rolling bearing segment 15. Arranged spaced apart therefrom is a further rolling bearing segment 15 (not visible), such that the swashplate 10 is supported twice.

The rolling bearing segment 15 comprises a multiplicity of cylindrical rollers 16 which are arranged in a full-roller configuration and/or without a cage and/or in direct contact with one another in the bearing gap 22. The full-roller configuration has the advantage that, in comparison with a design with a cage, it is possible to arrange a greater number of cylindrical rollers 16 over the same distance, such that the load rating is increased.

To ensure that, as the swashplate 10 is pivoted by the lever 14, the rolling bearing segment 15 or cylindrical rollers 17 are guided concomitantly in the correct position, the swashplate-type pivot bearing 17 formed by the cylindrical bearing surface 11, hollow cylindrical bearing surface 12 and the rolling bearing segment 15 has, in each case, one follow-up device 18 at the free ends of the rolling bearing segment 15. The follow-up devices 18 synchronize the position of the rolling bodies with the position of the bearing surfaces 11 and 12. Even though the rolling bearing segment 15 is in principle guided in the correct position by the housing part 3 and swashplate 10, it is not possible to rule out the possibility of some cylindrical rollers 16 slipping out of the most favorable position for the pivoting movement on account of vibrations or other disturbances. In order to reliably provide a follow-up adjustment and/or synchronization of the cylindrical rollers 16 and therefore of the rolling bearing segment 15, the follow-up devices 18 are provided, which both move relative to the housing part 3 and the swashplate 10 in the event of an actuation of the lever 14 and which press or slide the cylindrical rollers into the predefined position during the movement.

For a detailed illustration of the follow-up device 18, reference is made to FIGS. 2 and 3, which show the region around the follow-up devices 18 in a similar view (FIG. 2) and in a schematic plan view (FIG. 3) of the cylindrical bearing surface 11 of the swashplate 10.

As can be seen from FIG. 2, the follow-up device 18 comprises, as a guide member, a central bolt 19 which is held in a rotatable and—as can be seen in particular from FIG. 3—slidable fashion in an end stop body 20. A diameter step in the bolt 19 firstly prevents the bolt from being able to slip out of the end stop body 20 and to damage the swashplate-type pivot bearing 17. The diameter step also provides a guide surface between the bolt 19 and bearing surfaces 11, 12. Said guide surface ensures that the bolt cannot tilt. The greater the diameter difference is at the diameter step, the larger said guide surface. The end stop body 20 has, on the side facing toward the cylindrical rollers 16, a curved surface which is adapted to the shape of the cylindrical rollers 16 and which is designed for making contact with the cylindrical rollers 16. In particular, the curved surface serves to provide intimate contact. During a pivoting movement of the lever 14 and a resulting displacement of the rolling bearing segment 15, the end stop body 20 is guided by the bolt 19 in or counter to the rolling direction of the cylindrical rollers 16, and thereby defines an end stop for these. By virtue of the follow-up device 18 being arranged at both sides, a region in the bearing gap 22 is delimited at both sides between the follow-up devices 18, in which region the rolling bearing segment 15 and/or the cylindrical rollers 16 must be arranged in a positionally defined manner.

The guidance of the bolt 19 takes place by means of slots, with a first slot 21 being arranged in the cylindrical bearing surface 11 and a second slot 23 being arranged in the hollow cylindrical bearing surface 12, that is to say opposite in relation to the bearing gap 22. The first slot 21 is inclined in relation to the extent of the rolling bearing segment by an angle α in the plan view of FIG. 3. In the same way, the second slot 23 is also inclined by an equal or similar angle α, specifically in such a way that, in the plan view shown in FIG. 3, the two slots 21,23 cross at an intersection 25. As can be seen from the plan view, the intersection 25 at the same time defines a bearing point 26 for the bolt 19, which is positively guided by the first and second slots 21, 23 in the manner of a slotted guide.

If the cylindrical bearing surface 11 and the hollow cylindrical bearing surface 12 are now moved relative to one another in the event of an actuation of the lever 14, then the intersection 25 and therefore the bearing point 26 in FIG. 3 travels perpendicularly to the direction of extent 24 of the rolling body segment 15 in the axial direction of the swashplate-type pivot bearing 17. Here, the bolt 19 is driven concomitantly and moves in the end stop body 20 along a slotted hole 27. At the same time, it is ensured by means of the first and second slots 21,23 that the end stop body 20 has covered an equal or similar distance relative to the housing section 3 and the swashplate 10. The follow-up devices 18, which form the synchronization elements, therefore serve to ensure the correct position of the rolling bearing segment 15 with respect to the housing section 3 and the swashplate 10 or between the swashplate 10 and the housing section 3, at all times and in all positions of the lever 14.

LIST OF REFERENCE NUMERALS

1 Cylinder drum
2 Shaft
3 Housing section
4 Housing part
5 Bearing
6 Bearing
7 Cylinder bores
8 Piston
9 Sliding shoes
10 Swashplate
11 Cylindrical bearing surface
12 Hollow cylindrical bearing surface
13 Axis
14 Lever
15 Rolling bearing segment
16 Cylindrical rollers
17 Swashplate-type pivot bearing
18 Follow-up device
19 Bolt
20 End stop body
21 First slot
22 Bearing gap
23 Second slot
24 Extent
25 Intersection
26 Bearing point
27 Slotted hole

The invention claimed is:

1. A swashplate-type pivot bearing, comprising:
a housing section;
a swashplate section;
rolling bodies, with the swashplate section being pivotably mounted in the housing section by the rolling bodies, with the rolling bodies being arranged in at least one rolling body row in at least one of a full-roller configuration and a cage-free configuration, the at least one rolling body row having a first end and a second end opposite the first end; and
a first follow-up device arranged at the first end of the at least one rolling body row and a second follow-up device arranged at the second end of the at least one rolling body row, each of the first and second follow-up devices being movable relative to each of the swashplate section and the housing section during a pivoting movement of the swashplate-type pivot bearing,
wherein the first follow-up device is controlled by a slotted guide of the first follow-up device, the second follow-up device is controlled by a slotted guide of the second follow-up device, each of the first and second follow-up devices is configured as an end stop for the rolling bodies, the first follow-up device is moved by the slotted guide of the first follow-up device concomitantly with the rolling bodies during the pivoting movement of the swashplate-type pivot bearing, the second follow-up device is moved by the slotted guide of the second follow-up device concomitantly with the rolling bodies during the pivoting movement of the swashplate-type pivot bearing, wherein each slotted guide has a first guide slot, which is fixedly connected with the housing section, and a second guide slot, which is fixedly connected with the swashplate section, the first follow-up device has a first bolt that engages into the first guide slot and the second guide slot of the slotted guide of the first follow-up device, the second follow-up device has a second bolt that engages into the first guide slot and the second guide slot of the slotted guide of the second follow-up device, wherein the first guide slots are inserted on or in a raceway of the housing section, with a longitudinal extent of each of the first guide slots being inclined with respect to a longitudinal extent of the raceway of the housing section by a first acute angle, wherein the second guide slots are formed on or in a raceway of the swashplate section, with a longitudinal extent of each of the second guide slots being inclined with respect to a longitudinal extent of the raceway of the swashplate section by a second acute angle, the first acute angle and the second acute angle differing in magnitude from one another.

2. The swashplate-type pivot bearing of claim 1, wherein a relative movement of the first follow-up device relative to the slotted guide of the first follow-up device during the pivoting movement of the swashplate-type pivot bearing is concomitant, and a relative movement of the second follow-up device relative to the slotted guide of the second-follow up device during the pivoting movement of the swashplate-type pivot bearing is concomitant.

3. The swashplate-type pivot bearing of claim 1, wherein the first and second guide slots of each slotted guide have, in a plane of projection, an intersection, with the intersection forming a guide for a respective one of the first and second follow-up devices.

4. The swashplate-type pivot bearing of claim 1, wherein each of the first guide slots and each of the second guide slots extend in a direction perpendicular to a respective rotational axis of each of the rolling bodies and/or to a pivot axis of the swashplate-type pivot bearing.

5. The swashplate-type pivot bearing of claim 1, wherein each of the first guide slots and each of the second guide slots extend in a direction parallel to the raceway of the housing section and the raceway of the swashplate section.

6. The swashplate-type pivot bearing of claim 5, wherein each of the first guide slots is formed as a slot in the raceway of the housing section and each of the second guide slots is formed as a slot in the raceway of the swashplate section.

7. The swashplate-type pivot bearing of claim 1, wherein the first and second acute angles differ by less than 15°.

8. The Swashplate-type pivot bearing of claim 1, wherein the first and second acute angles differ by less than 10°.

9. The Swashplate-type pivot bearing of claim 1, wherein the first and second acute angles differ by less than 5°.

10. The swashplate-type pivot bearing of claim 1, wherein the rolling bodies are arranged in the at least one rolling body row in the cage-free configuration.

11. The swashplate-type pivot bearing of claim 1, wherein each of the first and second bolts includes a center section, a first end section and a second end section, the center section disposed between the first end section and the second end section, and the center section having a greater diameter than the first end section and the second end section such that a first diameter step on each of the first and second bolts provides a first guide surface with a first bearing surface of the swashplate section and a second diameter step on each of the first and second bolts provides a second guide surface with a second bearing surface of the housing section.

12. An axial piston machine with variable throughput volume, comprising the swashplate-type pivot bearing according to claim 1.

* * * * *